T. B. FARMER.
PROTECTED CABLE TERMINAL BOX FOR TELEPHONE SYSTEMS.
APPLICATION FILED NOV. 22, 1909. RENEWED FEB. 19, 1913.
1,078,843.
Patented Nov. 18, 1913.
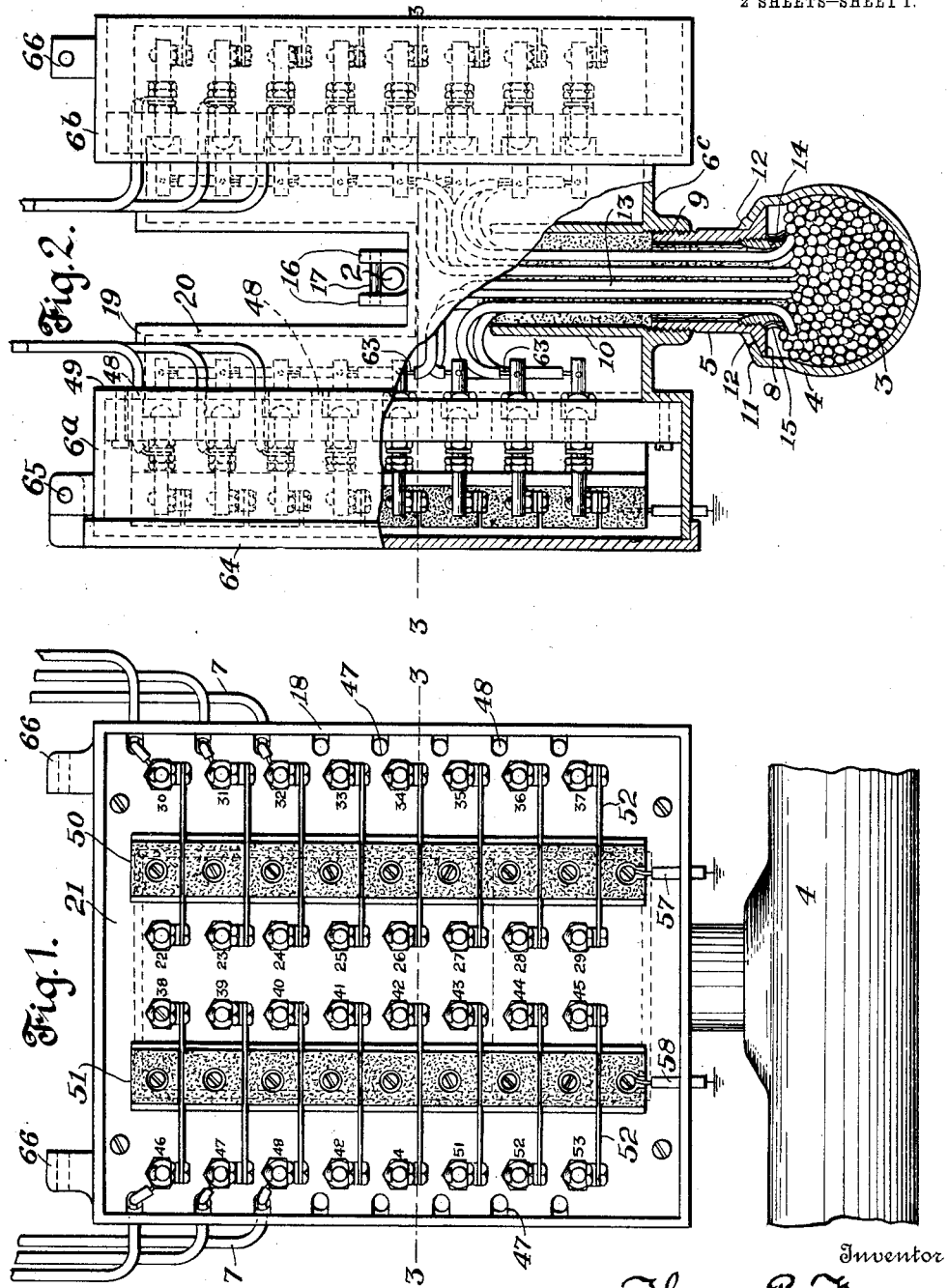

T. B. FARMER.
PROTECTED CABLE TERMINAL BOX FOR TELEPHONE SYSTEMS.
APPLICATION FILED NOV. 22, 1909. RENEWED FEB. 19, 1913.
1,078,843.
Patented Nov. 18, 1913.
2 SHEETS—SHEET 2.
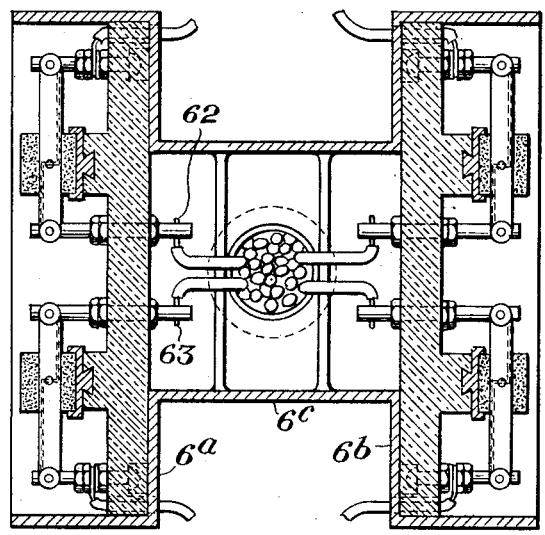
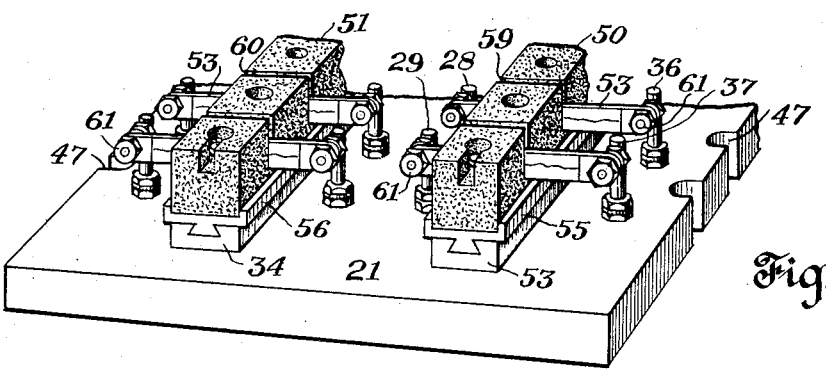
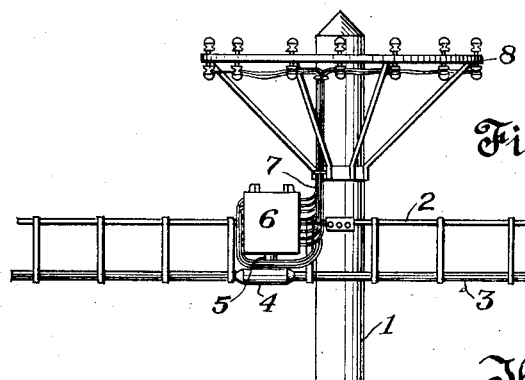
Inventor
Thomas B. Farmer
By Edward E. Clement
Attorney
Witnesses
H. Lowenstein
James H. Man

UNITED STATES PATENT OFFICE.

THOMAS BENJAMIN FARMER, OF BALTIMORE, MARYLAND.

PROTECTED-CABLE-TERMINAL BOX FOR TELEPHONE SYSTEMS.

1,078,843.  Specification of Letters Patent.  Patented Nov. 18, 1913.

Application filed November 22, 1909, Serial No. 529,499. Renewed February 19, 1913. Serial No. 749,532.

*To all whom it may concern:*

Be it known that I, THOMAS BENJAMIN FARMER, a citizen of the United States, residing at Baltimore, in the State of Maryland, have invented certain new and useful Improvements in Protected-Cable-Terminal Boxes for Telephone Systems, of which the following is a specification, reference being had therein to the accompanying drawing.

My invention relates to cable terminals and has for its object the production of a protected terminal device which shall be efficient in operation, relatively simple in design, and economical both as to first cost of installation and subsequent maintenance.

In order to attain my object I make use of a cast shell or box secured directly to a cable sheath or sleeve containing the wires from which taps are to be taken off, dividing the interior of the box by an insulating partition or septum carrying on its face a plurality of pairs of terminals and lightning arresters, and on its back connective terminals for the tap wires. I preferably combine two of these boxes in a single unit, set back to back and having a common sleeve connecting them to the cable beneath, and common intermediate attachments for securing them to a messenger wire. The incoming cable taps by this arrangement are entirely concealed and the cable is rendered proof against moisture; while the outgoing open wires are taken off from the backs of the box elements and led up between them, leaving both faces free for ready access to the terminal plates.

My invention is illustrated in the accompanying drawings in which—

Figure 1 is a face view of my terminal box with the lid off. Fig. 2 is an end view of the same. Fig. 3 is a horizontal section on the line 3—3 of Figs. 1 and 2, looking down. Fig. 4 is a detail of the lightning arrester. Fig. 5 is a view on a reduced scale showing the terminal box in position and connected to a cable.

Referring to the drawings, and especially to Fig. 5, 1 is a pole supporting a messenger wire 2 from which is hung a cable 3 having a sleeve 4 covering wire splices and connected through a hollow nipple 5 to the terminal box 6 into which the tap wires pass through the nipple or collar 5, and from which the open wires 7 pass up to the distributing ring 8. The box 6 is composed of two similar units connected by a hollow yoke near their lower ends, and hung from the messenger wire 2 which passes between them. All wires passing to and from the box are in intermediate planes as indicated in Fig. 5, and the terminals are therefore left free on both sides for ready access.

Referring now to Figs. 1, 2 and 3, the two box elements are shown at $6^a$ and $6^b$, connected by a hollow yoke $6^c$, through which the wires of the cable are led into both sides of the complete unit. Connection to the cable sleeve 4 is effected by means of the hollow nipple or collar 5, flanged or flared at its lower end as shown at 8, and threaded into a short flange on the yoke as shown at 9. Inside the yoke I provide a high upstanding tubular collar 10 constituting a continuation of the external collar 5. The latter is secured in the cable sleeve by slitting the latter from one end, cutting out an opening therein at the end of the slit, of a diameter less than that of the flange 8, turning back the flaps where slit, inserting the collar 5, closing the flaps and soldering up the slit and also the lips 11 to the flange 8 as indicated at 12. The tube 10 and the sleeve 5 are filled with ozite or other suitable composition which surrounds and closely adheres to the wires 13 sealing up the entrance to the cable sheath and rendering the same water and air tight. In order to prevent this composition from penetrating the wire space inside the sheath 4, I may provide a separate collaret or taping ring 14, threaded into the sleeve or nipple 5 and slightly flared at its lower end. This is taped around as shown at 15, and the tape should be carried down over the edge until it binds upon the wires themselves, thus absolutely confining the ozite composition to the interior of the tube.

Fig. 2 shows the messenger wire 2 passing between the units $6^a$ and $6^b$, and carrying the weight of the terminal through the medium of a cross pin 17 passing through ears 16 on the top of the yoke $6^c$. With this arrangement I secure a perfect balance of the entire device, and the actual distribution of wires is in a straight vertical plane rising from and passing through the center of the cable. The two elements $6^a$ and $6^b$ are precisely alike, therefore description of $6^a$ will suffice for both. This comprises a cast shell 18 reduced at 19 so as to have a shallow back-body of smaller linear dimensions than the front. Set into the front and covering the back-body so as to form a closed chamber therein, is a porcelain block 21, upon which are mounted all of the terminals and the lightning arresters. Terminals 22 to 29 and 31 to 38 respectively are cable terminals, and have their rear ends connected as shown in Fig. 2 to the wires leading down through the tube 10 into the cable. Terminals 30 to 37 and 39 to 46 inclusive on the other hand, are the open wire terminals from which the wires 7 are led out through notches 47 in the edge of the porcelain plate and registering openings 48 in the flange 49 on the back of the box.

Between the respective pairs of cable and open wire terminals, I secure two gang high potential arresters 50 and 51 each consisting of a carbon strip with transverse saw kerfs, to receive the fuse strips 52, which are of the Maxstadt type. As I consider this arrangement of high potential arrester to be original with me, and as my experience has shown it to be superior to anything heretofore in use and within my knowledge, I shall describe it somewhat more particularly, and shall make claims to it as a part of my invention.

Referring then to Fig. 4 which is a detail perspective view, 21 is the porcelain plate or block, carrying bars 53 and 54 in which are dovetailed slide strips 55 and 56. These carry the respective carbons 50 and 51, which are secured therein by a plurality of screws whose heads are well sunk into the carbon and the last one of which serves as a terminal in each case for attaching the ground wire 57 or 58. In the carbon strip 50 are a series of transverse saw kerfs or slots 59, and in the strips 51 are a series of corresponding slots 60. Secured upon the plate on opposite sides of the strips 50 and 51 and in line with these slots are the terminals 28—36 and 29—37. Between each pair a mica fuse strip 52 with copper ends is secured by means of the nuts 61. This lightning arrester is both simple and effective. Heretofore, when fuses have been laid flat across the surfaces of metal or carbon ground strips, high potential current could set up a more or less permanent arc straight across from one terminal to the other, but in the present case this is absolutely impossible, since the terminals are set lower than the top of the carbon strip, and no arc could pass across without either passing through the carbon or becoming so extended and attenuated that it could not persist.

Referring again to Figs. 1 to 3, it is thought the method of insulating this terminal will now be understood. Its connection to the cable sleeve 4 has already been explained. The box is supposed to have been suspended upon the messenger wire as indicated in Figs. 2 and 5, and the plates 21 are tilted forward after loosening their holding screws. The wires brought up through the tubes 10 are then taken to the proper terminals on the back of the respective plates and soldered or otherwise secured thereto as shown in Figs. 2 and 3, these connections being designated by the numerals 62 and 63. The plates are then replaced and secured to the shells. The open wires 7 are connected to the terminals 30, 31, 32, 39, 40, 41, etc. led through the slots and openings in the plate and back of the box and so up to the ring 8. Any cable wire can then be connected with its corresponding open wire by the mere insertion of the fuse, which is slipped into the slot and its copper terminals clamped under the nuts 61. Both faces of the twin elements of this terminal box are closed by swinging lids 64, pivoted at 65 to lugs 66 on top of the respective boxes. These lids may be provided with rubber gaskets and locks if desired.

I am aware that many changes and modifications may be made in matters of detail herein but I contemplate all such changes as fairly fall within the scope of the appended claims. I do not wish to limit myself to the exact form shown and described, as the uses of the terminal will determine in every case the particular form to be adopted. For example, I have found it convenient in some cases to make the figure of the boxes circular instead of rectangular as shown in Fig. 1. Such a circular box has certain advantages for particular purposes, and only slight modification is required to adapt the other features to it, such as arranging the terminals on radial lines in the box and curving the lightning arrester strips 50 and 51 so they will form arcs of circles. Another change which is almost obvious would be to substitute a branch cable for the tap wires 13. In such case the lead sheath of the branch cable would be soldered to the nipple 14, all around, and extended below the same preferably reduced in thickness and covered by the same wrapping which goes around the main cable wires.

It will be observed that the construction of my box and the connecting yoke 6° is such that the insulating plates 21 can be removed at any time and the inner ends of the terminals, with their wire connections, opened for inspection, without the necessity of removing any composition or filling. In other words, the wires and terminals are always clean and easy of access. At the same time, if desired, this portion of the box and yoke can be filled to meet special conditions.

The high potential arrester or protective device of Fig. 4, as heretofore stated, is capable of use in other connections, and in itself constitutes an important step of advance in the art. Heretofore it has been necessary to space the terminal posts a distance apart greater than the arcing distance of the potentials against which protection is desired. For this and other reasons devices for the same purpose have heretofore been not only cumbersome but relatively expensive. By the use of the present device I not only produce results heretofore unattainable for all potentials but materially reduce both the size and the cost. In operation, the first discharge through this arrester in leaping the gap between the fuse wire and the adjacent carbon, blows the fuse and breaks the terminal connection, at the same time leaving a smoked surface on the mica, to serve as a conductor for the second discharge, the mica itself thus becoming a conductor to carry the discharge to ground. Obviously, a double protection is thus provided against arcing between the terminals, those on the line side being cut off both electrically and mechanically from the incoming or highly charged terminals.

I do not claim herein the novel features of the cable terminal box as such, that forming the subject matter of a separate application, filed as a division hereof.

Having thus described my invention what I claim and desire to secure by Letters Patent is—

1. In a protective device, a plurality of terminals in opposed pairs, a carbon ground strip extending between opposite terminals of the respective pairs and rising above the plane of their heads, and inclosed fuse links connecting the pairs through slots in the carbon strip, each inclosure fitting tightly in its slot, and provided with small central openings to form air gaps between the fuse wire and the carbon faces, whereby abnormal line potentials may be discharged, but destructive arcing between the terminals is prevented, substantially as described.

2. A protective device comprising a pair of terminals with an insulating base, a carbon block between the terminals in position to intercept all direct lines of arcing, a transverse slot in said block, and connecting means between the terminals comprising a flat mica inclosure adapted to fit closely within the slot in the carbon block, conducting caps on the inclosure, and a fuse wire within the same connecting the caps, said inclosure being provided with an opening of circumscribed area intermediate of its ends to expose the fuse wire in contiguity to but out of contact with the carbon block, substantially as described.

In testimony whereof I affix my signature in presence of two witnesses.

THOMAS BENJAMIN FARMER.

Witnesses:
JACOB SLINE,
JAMES H. MARR.

---

Copies of this patent may be obtained for five cents each, by addressing the "Commissioner of Patents, Washington, D. C."